(12) United States Patent
Jaaskelainen et al.

(10) Patent No.: US 11,970,934 B2
(45) Date of Patent: Apr. 30, 2024

(54) MEMORY TOOL FOR A RETRIEVABLE FLOW METER DEVICE

(71) Applicant: Halliburton Energy Services, Inc., Houston, TX (US)

(72) Inventors: Mikko K. Jaaskelainen, Katy, TX (US); Julian Drew, Centennial, CO (US); Barry Fish, Denver, CO (US)

(73) Assignee: Halliburton Energy Services, Inc., Houston, TX (US)

( * ) Notice: Subject to any disclaimer, the term of this patent is extended or adjusted under 35 U.S.C. 154(b) by 35 days.

(21) Appl. No.: 17/832,451

(22) Filed: Jun. 3, 2022

(65) Prior Publication Data

US 2023/0392495 A1 Dec. 7, 2023

(51) Int. Cl.
*E21B 49/08* (2006.01)
*E21B 47/107* (2012.01)

(52) U.S. Cl.
CPC ........ *E21B 47/107* (2020.05); *E21B 2200/22* (2020.05)

(58) Field of Classification Search
CPC ....... E21B 43/12; E21B 34/08; E21B 49/0875
See application file for complete search history.

(56) References Cited

U.S. PATENT DOCUMENTS

| | | | | |
|---|---|---|---|---|
| 2003/0218547 A1* | 11/2003 | Smits | .................. | E21B 47/26 340/854.8 |
| 2005/0241835 A1* | 11/2005 | Burris, II | ................ | E21B 23/10 166/313 |
| 2007/0261486 A1* | 11/2007 | Fallet | ..................... | E21B 47/10 73/152.29 |
| 2013/0042699 A1* | 2/2013 | Schultz | ................ | G01F 1/3227 73/861.19 |
| 2015/0377667 A1 | 12/2015 | Ahmad et al. | | |
| 2016/0222772 A1* | 8/2016 | Al-Muntasheri | ....... | E21B 43/02 |
| 2019/0120048 A1* | 4/2019 | Coffin | .................... | E21B 47/06 |
| 2019/0136674 A1 | 5/2019 | Fripp et al. | | |
| 2021/0040813 A1* | 2/2021 | Inyang | ................... | E21B 47/11 |
| 2021/0055146 A1 | 2/2021 | Bukhamseen et al. | | |

(Continued)

OTHER PUBLICATIONS

Halliburton Energy Services, Inc., unpublished U.S. Appl. No. 63/263,89, filed Feb. 18, 2022. In accordance with the waiver of the Copy Requirements in 37 CFR 1.98, for cited pending U.S. Patent applications, 1287 O.G. 163 (Oct. 19, 2004).

(Continued)

*Primary Examiner* — Kipp C Wallace
(74) *Attorney, Agent, or Firm* — Kilpatrick Townsend & Stockton LLP

(57) ABSTRACT

Multi-phase measurements of a fluid in a wellbore can be received and stored by a memory tool for determining flow characteristics of fluid flowing in the wellbore. A system can include a flow meter device, one or more sensors, and a memory tool The flow meter device can include one or more acoustic devices that can be positioned to generate acoustic signals in a wellbore. The one or more sensors can be positioned to detect the acoustic signals from the flow meter device for making multi-phase measurements of fluid with respect to the wellbore. The memory tool can be communicatively coupled to the one or more sensors to receive and store the multi-phase measurements for a predetermined amount of time for determining flow characteristics of the fluid.

17 Claims, 7 Drawing Sheets

(56) References Cited

U.S. PATENT DOCUMENTS

2021/0201178 A1    7/2021  Fanini et al.
2021/0340869 A1*  11/2021  Syresin ................... E21B 47/10
2022/0018237 A1    1/2022  Sheth et al.
2023/0100331 A1*   3/2023  Al Dossary ............. E21B 47/01
                                                    166/250.01

OTHER PUBLICATIONS

Halliburton Energy Services, Inc., International Search Report and Written Opinion, PCT/US2022/032265, dated Feb. 27, 2023, 11 pages.

\* cited by examiner

MEMORY TOOL FOR A RETRIEVABLE FLOW METER DEVICE

TECHNICAL FIELD

The present disclosure relates generally to wellbore operations and, more particularly (although not necessarily exclusively), to a memory tool for a flow meter device that can be positioned in a wellbore.

BACKGROUND

A wellbore can be formed in a subterranean formation or a sub-oceanic formation for extracting produced hydrocarbon material. Fluid can be produced from the wellbore. The fluid can be multi-phase fluid and can include oil, water, gas, other suitable material from the formation, or any suitable combination thereof. Measurements with respect to the fluid can be made to determine information about the fluid. The information can include properties such as fluid density, flow rate, and the like. But, measuring the fluid can be difficult. For example, the combination of phases of the fluid may render the measurements difficult to interpret and other related difficulties.

DETAILED DESCRIPTION

Figure 1:
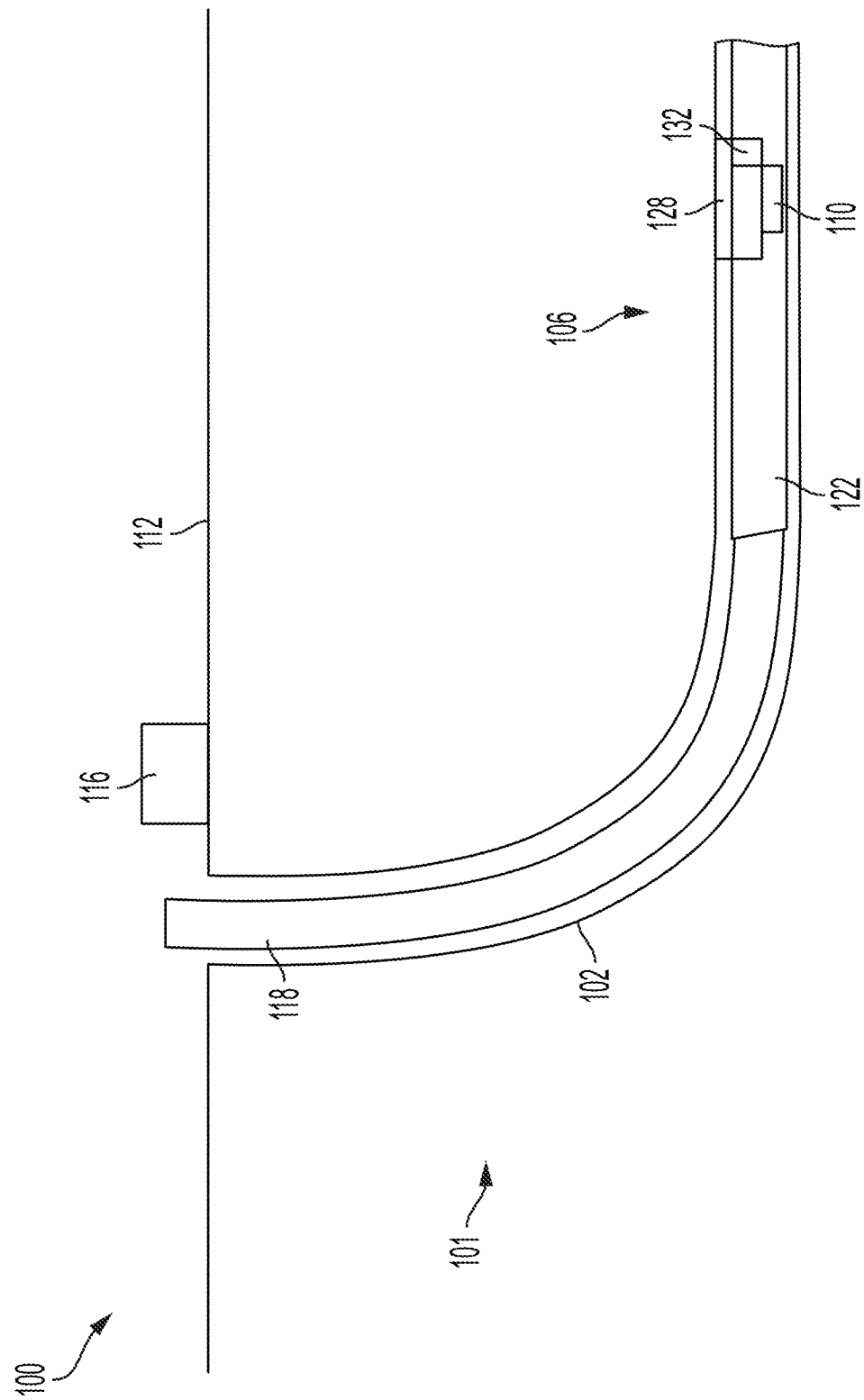
FIG. 1 is a schematic of an example of a wellbore with components for making and recording multi-phase measurements of fluid in a wellbore according to one example of the present disclosure.

Certain aspects and examples of the present disclosure relate to a flow meter device that includes a memory tool for making multi-phase measurements of a fluid in a wellbore. The fluid can be a multi-phase fluid in which various phases of fluid can co-mingle. For example, the various phases can include oil, water, gas, a combination thereof, and the like. Multi-phase measurements of the fluid can include measuring differential pressure, temperature, orientation, vibration, electrical signals such as resistivity, and the like for determining respective viscosities and flow rates of constituent phases in the multi-phase fluid. Additionally, multi-phase measurements can be used to identify the types of phases and phase ratios of the multi-phase fluid. The multi-phase flow meter device can be used to make the multi-phase measurements using one or more acoustic devices such as a fluidic oscillator, hole-tone whistle, and the like. The memory tool can be positioned on the flow meter device, or in other suitable locations communicatively coupled to the flow meter device, and can record and store the multi-phase measurements for retrieval after a predetermined amount of time for determining fluid characteristics relating to fluid flow of the multi-phase fluid.

By incorporating a memory tool with a flow meter device, multi-phase measurements may be recorded and analyzed without incorporating a distributed acoustic sensing (DAS) system in the wellbore. DAS system deployments may require optical fibers in the wellbore and can be time consuming and use excessive resources. In some examples, a wellbore can be created with experimental well designs. The wellbore can also be designed with varying parameters such as perforation cluster size, distance between clusters, asymmetric perforation spacing, different treatment parameters, etc. In some examples, when the effects of various parameters are being researched, the experimental wellbore designed without a DAS system can be beneficial. The memory tool can provide a means to record and retrieve data in the experimental wellbore. In some examples, the memory tool can be deployed in a wellbore that incorporate a DAS system.

In some examples, electrical sensors can be included in a flow meter device housing in which vibrations, differential pressure, absolute pressure, temperature, and other values can be measured in order to detect bulk flow rates and phase fractions of various phases of a multi-phase fluid in a wellbore. Signal generating elements can include one or more acoustic devices, such as fluidic oscillators, hole-tone whistles, or other suitable acoustic devices, such that the instrumented flow meter device housing can be deployed and retrieved using a deployment tool, such as a coiled tubing, a wireline, a slickline, etc., in combination with gravity deployment, tractored deployment, pushed-in-coil deployment, etc.

The memory tool device may be temporarily attached or coupled to the flow meter device, to a wall of the wellbore, or to a combination thereof. After a predetermined amount of time, the memory tool can be released to be retrieved from the wellbore. For example, if the memory tool is attached to the flow meter device or the wellbore using dissolvable elements, then, for example subsequent to exposing the dissolvable elements to wellbore fluid or other suitable fluid, the dissolvable elements may dissolve for detaching the memory tool device. Once detached, the memory tool device can be retrieved or can otherwise flow to the surface of the wellbore.

In some examples, the memory tool device may remain attached to, for example, a deployment tool, such as a coiled tubing, a wireline, or a slickline, that is conveyed into the well and positioned in the well for a period of time to collect data at multiple points along the wellbore. The data, such as one or more multi-phase measurements, can be collected in real-time using, for example, data telemetry through acoustic signal generation with acoustic data detected in the deployment tool with DAS technology. Additionally or alternatively, the data can be measured by a sensing system and recorded by a battery powered memory tool device. The memory tool device, and data relating to multi-phase fluid and recorded by the memory tool device can be retrieved.

In some examples, the multi-phase fluid measurements made by the flow meter device and recorded by the memory tool can be used to determine flow characteristics about multi-phase fluid flowing in the wellbore. The multi-phase fluid measurements can include differential pressure, absolute pressure, vibration, electrical signals or resistivity, and other suitable measurements that can be made using the flow meter device that includes one or more acoustic devices. The flow characteristics can include phase-specific flow information such as flow rate, viscosity, composition, and ratio of respective phases of the multi-phase fluid. A computing device can receive the multi-phase measurements stored by the memory tool, and the computing device can use the multi-phase measurements to determine the flow characteristics of the multi-phase fluid.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of an example of a wellbore system 100 for making multi-phase measurements of fluid in a wellbore 102 according to one example of the present disclosure. In some examples, the wellbore system 100 is depicted for a wellbore 102, such as an oil or gas wellbore, for extracting fluids from a subterranean formation 101. The wellbore 102 can be used to extract water, oil, gas, other suitable fluid or material, or any combination thereof from the subterranean formation 101. As illustrated, the wellbore 102 is formed in the subterranean formation 101, but the wellbore 102 can be formed in a sub-oceanic formation or in other suitable locations. The wellbore 102 can include a casing 118 or other suitable component for allowing produced fluid, such as multi-phase fluid, to be extracted from the wellbore 102.

The wellbore system 100 can include a flow meter device 128 and a well tool or downhole tool 122. The downhole tool 122 can be any suitable tool used to gather information about the wellbore 102. For example, the downhole tool 122 can be a tool delivered downhole by wireline to perform operations such as wireline formation testing. Alternatively, the downhole tool 122 can include a completion tool, a stimulation tool, a production tool, an exploration tool, etc. In some examples, the downhole tool 122 can be used to deploy the flow meter device 128 in the wellbore 102.

The flow meter device 128 can include one or more acoustic devices 110, a memory tool 132, and any other suitable component for making multi-phase measurements relating to fluid flowing in the wellbore 102. As illustrated in FIG. 1, one flow meter device 128 is positioned in the wellbore 102, and the flow meter device 128 includes one memory tool 132 and one acoustic device 110. In other examples, more than one flow meter device 128, more than one memory tool 132, more than one acoustic device 110, or a combination thereof, can be positioned in the wellbore 102 for making multi-phase measurements relating to the fluid.

The flow meter device 128 can be positioned in the wellbore 102. For example, the flow meter device 128 can be affixed to, or otherwise positioned in, the casing 118 of the wellbore 102. In some examples, the flow meter device 128 can be positioned in a substantially horizontal section 106 of the wellbore 102. The flow meter device 128 can be positioned in any other suitable location, such as at the surface 112, etc., with respect to the wellbore 102 for making multi-phase measurements relating to the fluid flowing in the wellbore 102. The fluid can travel through the flow meter device 128, and the flow meter device 128 can generate, or otherwise facilitate any sub-component like the acoustic device 110 to generate, acoustic signals.

The flow meter device 128 can include one or more acoustic devices 110 such as a symmetric fluidic oscillator, an asymmetric fluidic oscillator, or a hole-tone whistle. The flow meter device 128 can include one, two, three, four, or more acoustic devices 110. The acoustic devices can be designed to generate acoustic waves with different frequency ranges that correspond to different phases of fluid. The flow meter device 128 can include a number of acoustic devices 110 that correspond to a number of phases included or expected to be in fluid produced via the wellbore 102. For example, if the fluid includes or is expected to include three phases corresponding to oil, gas, and water, then the flow meter device 128 can include three acoustic devices 110 to perform a multi-phase measurement of the fluid. In such an example, the three acoustic devices 110 may be positioned in different locations, such as around a circumference of the flow meter device 128, etc., with respect to the flow meter device 128. In some examples, the number of acoustic devices 110 in the flow meter device 128 may not correspond to the number of phases of the fluid and can be greater than or less than the number of phases present in the fluid.

Additionally, or alternatively, more than one flow meter device 128 can be included in the wellbore 102 to perform the multi-phase measurement of the fluid. For example, if the fluid includes or is expected to include three phases, then three different flow meter devices can be included in the wellbore 102. The three different flow meter devices can be positioned a minimum distance apart and each may include a different fluidic oscillator for measuring a different phase of the fluid. In some examples, the number of flow meter devices can be greater than or less than the number of phases present in the fluid.

The flow meter device 128 can include a plurality of sensors for detecting vibrations, differential pressure, absolute pressure, temperature, orientation, and the like. As fluid flows through or otherwise with respect to the flow meter device 128, the sensors may detect or otherwise make the multi-phase measurements relating to the fluid in the wellbore 102. The sensors can be positioned in any suitable location with respect to the flow meter device 128. For example, one or more sensors can be positioned at an entrance of fluid into the flow meter device 128, at feedback loops within the acoustic device 110, at an exit of fluid flowing through the flow meter device 128, or in any other suitable location with respect to the flow meter device 128 for making the multi-phase measurement of the fluid.

The sensors may be communicatively coupled to the memory tool 132, which can be positioned on the flow meter device 128 or in other suitable locations with respect to the wellbore 102. The sensors can transmit the multi-phase measurements to the memory tool 132, and the memory tool 132 can save, store, or otherwise record the multi-phase measurements for subsequent use. As illustrated, the memory tool 132 is positioned on (e.g., mechanically coupled to) the flow meter device 128. In some examples, the memory tool 132 can be positioned in the wellbore 102 and detached from the flow meter device 128. As illustrated, one memory tool 132 is positioned in the wellbore 102, but more than one memory tool 132 can be positioned in the wellbore 102.

The memory tool 132 can receive signals from the flow meter device 128, such as from sensors positioned in or proximate to the flow meter device 128, or from sensors elsewhere in the wellbore. The signals received by the memory tool 132 can be converted to data that can be stored by the memory tool 132. Data in the memory tool 132 can be recorded to battery powered memory modules and collected upon retrieval of the memory tool 132. For example, after a predetermined amount of time, the memory tool 132 can be retrieved from the wellbore 102 for retrieving the multi-phase measurements made by the flow meter device 128, or sensors thereof, and stored by the memory tool 132. Additionally or alternatively, after the predetermined amount of time, a computing device 116 can be communicatively coupled to the memory tool 132 to retrieve the multi-phase measurements.

In some examples, the computing device 116 can be positioned at the surface 112 of, or in other locations such as downhole, remote, etc. with respect to, the wellbore 102. The computing device 116 can be communicatively coupled to other components of the wellbore 102, such as the downhole tool 122, etc. The computing device 116 can be communicatively coupled to the memory tool 132 subsequent to the predetermined amount of time. For example, the memory tool 132 can be retrieved from the wellbore 102, or the computing device 116 can be communicatively coupled to (e.g., via wired or wireless connections) to the memory tool 132. The memory tool 132 can transmit the stored multi-phase measurements to the computing device 116. The computing device 116 can receive the multi-phase measurements from the memory tool 132 via other suitable techniques.

The computing device 116 can interpret the multi-phase measurements to determine flow characteristics of the fluid flowing in the wellbore 102. For example, the computing device 116 can determine, for example via a trained learning model or other suitable software, a type of fluid flowing in the wellbore 102, ratios of phases included in the wellbore 102, one or more flow rates of respective phases of the fluid, one or more viscosities of the respective phases of the fluid, or any other suitable flow characteristics with respect to fluid flowing in the wellbore 102. In some examples, the computing device 116 can determine an amount of produced fluid from one or more locations of the wellbore 102. In some examples, the computing device 116 can receive orientation information from the flow meter device 128, from the downhole tool 122, or from other suitable components of the wellbore 102. The computing device 116 can use the orientation information to interpret the received data.

Figure 2:
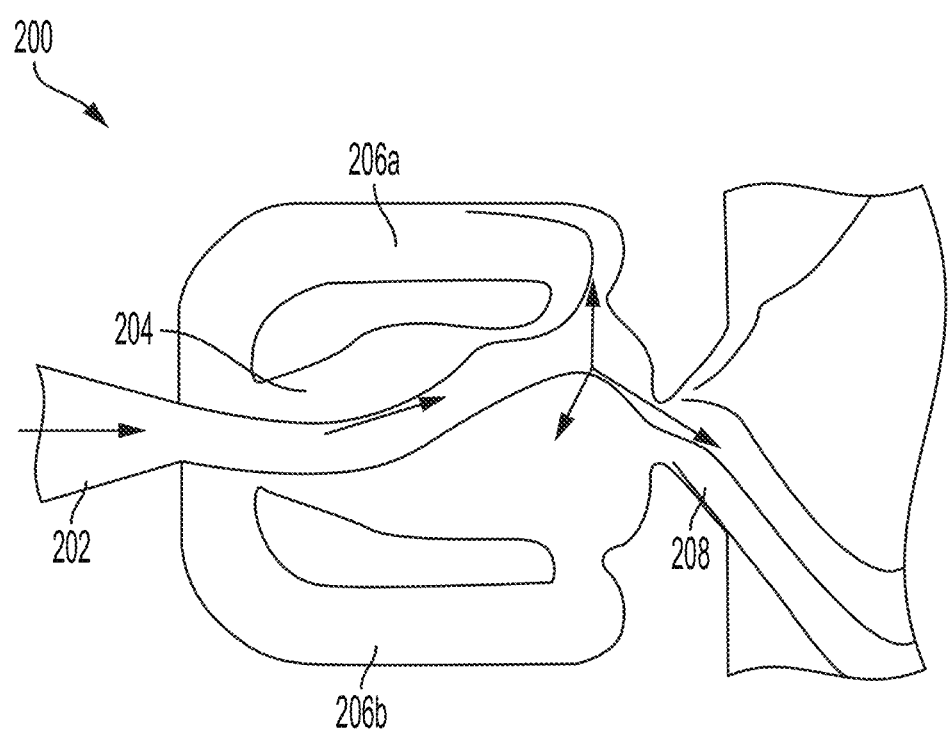
FIG. 2 is a diagram of fluid flow with respect to an acoustic device according to one example of the present disclosure.

FIG. 2 is a diagram of a fluid flow with respect to a fluidic oscillator 200 according to one example of the present disclosure. The fluidic oscillator 200 can be or can otherwise be included in the acoustic device 110. The fluidic oscillator 200 can include an inlet channel 202, a mixing chamber 204, feedback loops 206*a-b*, and an outlet channel 208. The inlet channel 202 may be coupled to the mixing chamber 204, which may be coupled to the feedback loops 206*a-b* and the outlet channel 208. The fluidic oscillator 200 can include other or different suitable components. Additionally, while illustrated as symmetric, the fluidic oscillator 200 may be asymmetric or otherwise include an asymmetric feature. For example, the outlet channel 208 or other suitable feature of the fluidic oscillator 200 may be asymmetric.

Fluid may be directed into the fluidic oscillator 200 via the inlet channel 202. The fluid may travel into the mixing chamber 204, and the fluid may oscillate such as, for example, in the mixing chamber 204, by traveling through one or more of the feedback loops 206*a-b*, by flowing through the outlet channel 208, etc. The frequency of oscillation of the fluid may depend on various factors. For example, the frequency of oscillation of the fluid can be a linear function of the flow rate of the fluid. Additionally or alternatively, the frequency of oscillation of the fluid may depend on pressure drop, such as the square root of the pressure drop, in the fluidic oscillator 200. The frequency of oscillation may depend on other suitable factors relating to the fluidic oscillator 200. In some examples, the oscillation of the fluid in the fluidic oscillator 200 may cause acoustic signals to be generated. Acoustic signals generated from other fluidic oscillators, such as symmetric fluidic oscillators, etc., may not include an intensity large enough to be detected with respect to the wellbore 102. Accordingly, the fluidic oscillator 200, or the acoustic device 110, may be asymmetric to generate acoustic signals with increased intensity compared to the other fluidic oscillators.

Figure 3:
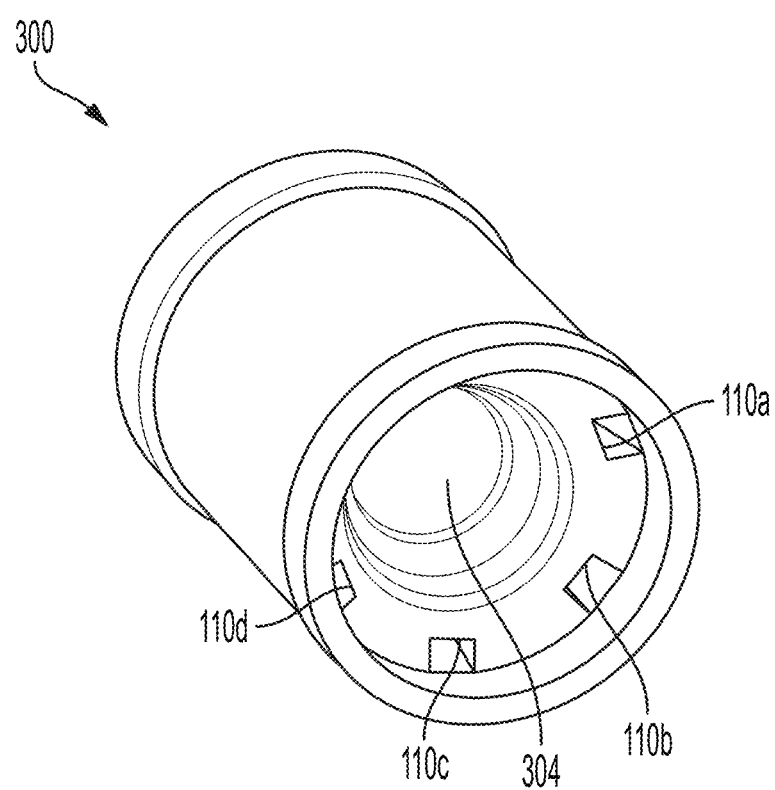
FIG. 3 is a perspective view of a flow meter device according to one example of the present disclosure.

FIG. 3 is a perspective view of a flow meter device 128 according to one example of the present disclosure. The flow meter device 128 can be positioned in the wellbore 102, at the surface 112 of the wellbore 102, or in other suitable locations for making multi-phase measurements of fluid flowing in the wellbore 102. In some examples, the flow meter device 128 can be positioned in the casing 118 or other suitable flow line of the wellbore 102. The flow meter device 128 can be used to determine flow rate and other information relating to fluid flowing with respect to the wellbore 102. The flow meter device 128 can include a set of acoustic devices 110*a-d* and a bore hole 304. While illustrated with four acoustic device 110*a-d*, the flow meter device 128 can include other suitable numbers, such as less than four or more than four, of acoustic devices 110. The flow meter device 128 can include any other suitable components.

The flow meter device 128 can include a number of acoustic devices 110 that corresponds to a number of phases of fluid from the wellbore 102. For example, if the fluid includes four phases, then the flow meter device 128 can include, as illustrated, four acoustic devices 110. As illustrated, the acoustic devices 110*a-d* are positioned at or near the circumference of the flow meter device 128, but the acoustic devices 110*a-d* can be positioned in other suitable locations with respect to the flow meter device 128. The acoustic devices 110*a-d* can be positioned to detect or otherwise sense data relating to one or more phases of the fluid. For example, the acoustic device 110*a* may be positioned to sense data about a gas phase of the fluid, the acoustic device 110*b* may be positioned to sense data about a combination oil/gas phase of the fluid, the acoustic device 110*c* may be positioned to sense data about a water phase of the fluid, etc. The bore hole 304 may be positioned in (or approximately in) the center of the flow meter device 128. The size of the bore hole 304, the shape of the bore hole 304, or a combination thereof can be selected based on expected fluid properties, the acoustic device 110 type or placement, desired measurements, other suitable parameters, or any combination thereof. In some examples, the bore hole 304 may be omitted.

Figure 4:
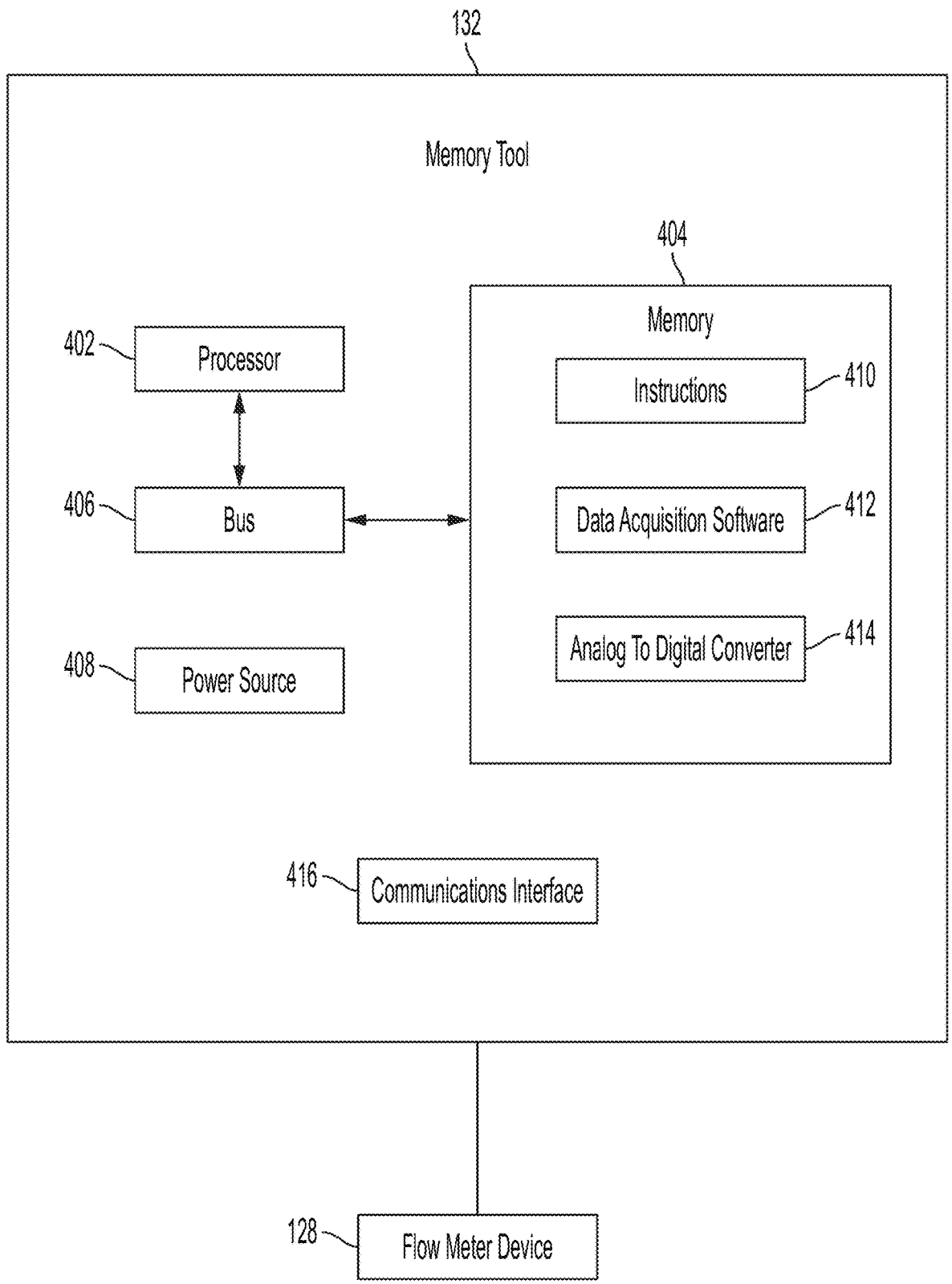
FIG. 4 is a block diagram of a memory tool for making multi-phase fluid measurements according to one example of the present disclosure.

FIG. 4 is a block diagram of a memory tool 132 that can receive and store multi-phase fluid measurements according to one example of the present disclosure. The components shown in FIG. 4, such as the processor 402, the memory 404, the bus 406, and the like, may be integrated into a single structure such as within a single housing of the memory tool 132. Alternatively, the components shown in FIG. 4 can be distributed from one another and in electrical communication with each other.

As illustrated, the memory tool 132 includes the processor 402 communicatively coupled to the memory 404 by the bus 406. The processor 402 can include one processor or multiple processors. Non-limiting examples of the processor 402 include a Field-Programmable Gate Array (FPGA), an application-specific integrated-circuit (ASIC), a microprocessor, or any combination of these. The processor 402 can execute instructions 410 stored in the memory 404 to perform various operations. In some examples, the instructions 410 can include processor-specific instructions generated by a compiler or an interpreter from code written in any suitable computer-programmable language, such as C, C++, C#, or Java.

The memory 404 can include one memory device or multiple memory devices. The memory 404 can be non-volatile and may include any type of memory device that retains stored information when powered off. Non-limiting examples of the memory 404 include electrically erasable and programmable read-only memory (EEPROM), flash memory, or any other type of non-volatile memory. At least some of the memory 404 can include a non-transitory computer readable medium from which the processor 402 can read the instructions 410. The non-transitory computer readable medium can include electrical, optical, magnetic, or other storage devices capable of providing the processor 402 with instructions 410 or other program code. Non-limiting examples of the non-transitory computer readable medium include magnetic disk(s), memory chip(s), random access memory (RAM), an ASIC, a configured processor, or any other medium from which a computer processor can read the instructions 410.

Additionally, the memory 404 can further include data acquisition software 412 and an analog to digital converter 414. The analog to digital converter 414 can transform signals received by the data acquisition software 412 into a suitable form of data for storing or logging by the memory tool 132. Data stored or logged by the memory tool can include vibrations, differential pressure, absolute pressure, flow rates of fluid, orientation of the acoustic devices 110, other suitable data, or any suitable combination thereof.

The memory tool 132 can be communicatively coupled to other components of the wellbore 102, such as the flow meter device 128, or any sensors thereof, etc. The memory tool 132 can receive signals from the sensors of the flow meter device 128. For example, at least one acoustic device 110 can generate and propagate acoustic signals based on fluid flowing in the wellbore 102, and the sensors can convert the acoustic signals into signals that can be received and stored by the memory tool 132. For example, the sensors can convert the acoustic signals to electrical or optical signals and can transmit the converted signals to the memory tool 132 for storage for a predetermined amount of time.

Figure 5:
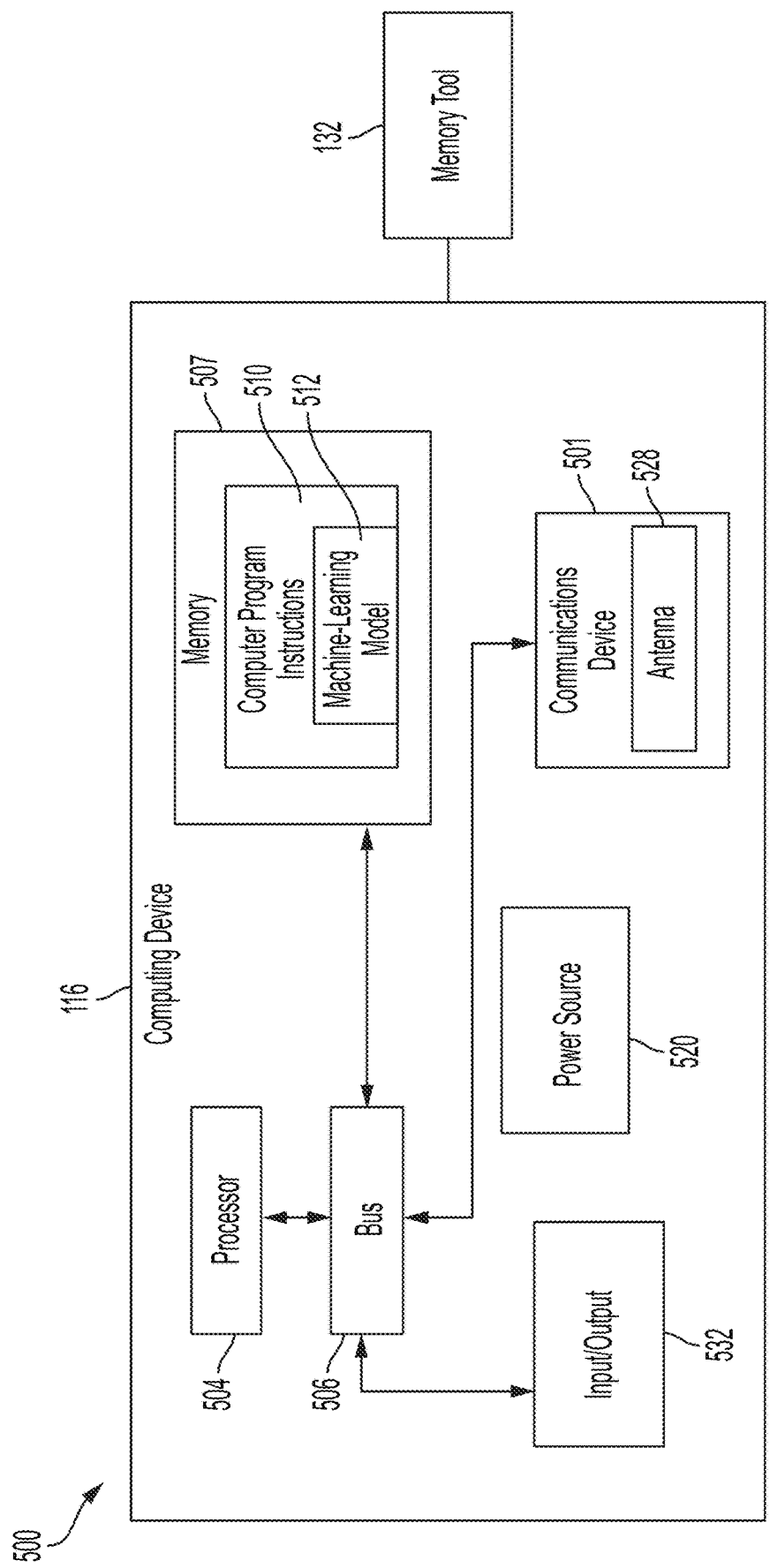
FIG. 5 is a block diagram of a computing system for determining flow characteristics based on multi-phase fluid measurements stored using a memory tool according to one example of the present disclosure.

FIG. 5 is a block diagram of a computing system 500 for determining flow characteristics based on multi-phase fluid measurements stored using a memory tool 132 according to one example of the present disclosure. The components shown in FIG. 5, such as the processor 504, memory 507, power source 520, and communications device 501, etc., may be integrated into a single structure, such as within a single housing of a computing device 116. Alternatively, the components shown in FIG. 5 can be distributed from one another and in electrical communication with each other.

The computing system 500 may include the computing device 116. The computing device 116 can include the processor 504, the memory 507 (e.g., non-volatile), and a bus 506. The processor 504 can execute one or more operations for interpreting multi-phase measurements from the memory tool 132 and determining flow characteristics, such as fluid type, flow rate, phase ratios, etc., relating to the multi-phase fluid flowing in, or from, the wellbore 102. The processor 504 can execute instructions stored in the memory 507 to perform the operations. The processor 504 can include one processing device or multiple processing devices or cores. Some examples of the processor 504 include an FPGA, an ASIC, a microprocessor, etc.

The processor 504 can be communicatively coupled to the memory 507 via the bus 506. The memory 507 may include any type of memory device that retains stored information when powered off. Some examples of the memory 507 may include EEPROM, flash memory, or any other type of non-volatile memory. In some examples, at least part of the memory 507 can include a medium from which the processor 504 can read the instructions. A computer-readable medium can include electronic, optical, magnetic, or other storage devices capable of providing the processor 504 with computer-readable instructions or other program code. Some examples of a computer-readable medium include magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language such as C, C++, C#, Java, Python, etc.

In some examples, the memory 507 can include computer program instructions 510 for generating, training, and applying a machine-learning model 512. For example, the computer program instructions 510 can include the machine-learning model 512 that is executable by the processor 504 for causing the processor 504 to determine, using multi-phase measurements, which are from the memory tool 132 and made by using the flow meter device 128, flow characteristics for fluid flowing with respect to the wellbore 102. The machine-learning model 512 can be trained using historical flow data, such as from a reference wellbore, synthetic data, or a combination thereof. For example, the computing device 116 can receive data indicating historical flow from a reference wellbore. Additionally, the computing device 116 can generate synthetic data by generating, for example instead of measuring or receiving, varying types of data relating to multi-phase fluid flow. The computing device 116 can generate training data using the historical flow data and the synthetic data, and the computing device 116 can use the training data to train the machine-learning model 512 to interpret the multi-phase measurements from the memory tool 132. For example, the trained machine-learning model 512 can be applied to the multi-phase measurements stored on the memory tool 132. In some examples, the multi-phase measurements can additionally include orientation information, such as data relating to the arrangement of the acoustic devices 110 with respect to the wellbore 102, to determine flow characteristics, such as phase-specific flow rate, ratio of phases, type of fluid, phase-specific viscosities, etc., for the fluid.

The computing device can include a power source 520. The power source 520 can be in electrical communication with the computing device 116 and the communications device 501. In some examples, the power source 520 can include a battery or an electrical cable such as a wireline. The power source 520 can include an AC signal generator. The computing device 116 can operate the power source 520 to apply a transmission signal to an antenna 528 to generate electromagnetic waves that convey data relating to the multi-phase measurements, the memory tool 132, the one or more acoustic devices 110, the flow characteristics, etc. to other systems. For example, the computing device 116 can cause the power source 520 to apply a voltage with a frequency within a specific frequency range to the antenna 528. This can cause the antenna 528 to generate a wireless transmission. In other examples, the computing device 116, rather than the power source 520, can apply the transmission signal to the antenna 528 for generating the wireless transmission.

In some examples, part of the communications device 501 can be implemented in software. For example, the communications device 501 can include additional instructions stored in memory 507 for controlling functions of the communications device 501. The communications device 501 can receive signals from remote devices and transmit data to remote devices. For example, the communications device 501 can transmit wireless communications that are modulated by data via the antenna 528. In some examples, the communications device 501 can receive signals, which may be associated with data to be transmitted, from the processor 504 and amplify, filter, modulate, frequency shift, or otherwise manipulate the signals. In some examples, the communications device 501 can transmit the manipulated signals to the antenna 528. The antenna 528 can receive the manipulated signals and responsively generate wireless communications that carry the data.

The computing device 116 can additionally include an input/output interface 532. The input/output interface 532 can connect to a keyboard, pointing device, display, and other computer input/output devices. An operator may provide input using the input/output interface 532. Data relating to the multi-phase measurements made by the flow meter device 128 and flow characteristics can be displayed to an operator of the wellbore 102 through a display that is connected to or is part of the input/output interface 532. Displayed values can be observed by the operator, or by a supervisor of the wellbore 102, who can make adjustments to wellbore operations based on the displayed values. Additionally or alternatively, the computing device 116 can automatically control or adjust wellbore operations based on the multi-phase measurements or flow characteristics.

Figure 6:
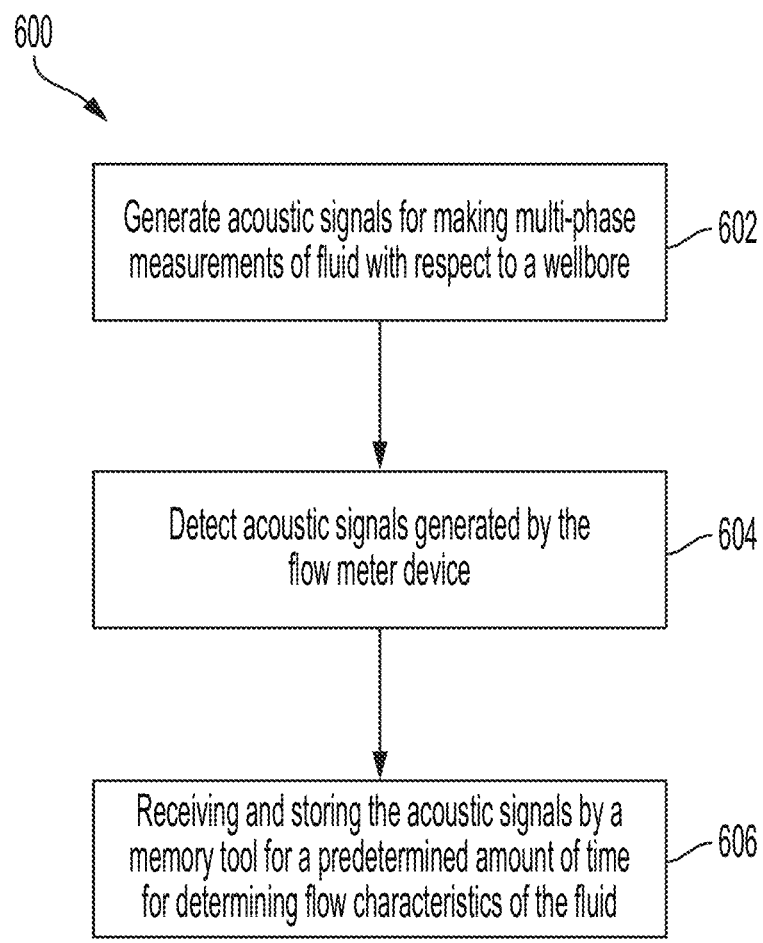
FIG. 6 is a flow chart of a process for making multi-phase fluid measurements by a flow meter device with a memory tool according to one example of the present disclosure.

FIG. 6 is a flow chart of a process 600 for receiving and storing multi-phase fluid measurements made by a flow meter device 128 on a memory tool 132 according to one example of the present disclosure. The process 600 may be performed by software, firmware, hardware, or a combination thereof. At block 602, acoustic signals for making multi-phase measurements of fluid with respect to a wellbore are generated by one or more acoustic devices 110 positioned in a flow meter device 128. In some examples, the wellbore 102 can be a horizontal wellbore or can otherwise include a substantially horizontal section. The flow meter device 128 can be positioned in the wellbore 102 by a deployment tool or via other suitable techniques. In some examples, the flow meter device 128 can include an arrangement of acoustic devices 110 that can generate the acoustic signals. Examples of acoustic devices can include symmetric or asymmetric fluidic oscillators, hole-tone whistles, and the like.

In some examples, the acoustic devices 110 can be arranged to generate acoustic signals corresponding to various phases of the fluid flowing in the wellbore 102. For example, a first acoustic device can be positioned in the flow meter device 128 to generate acoustic signals for a gas phase of the fluid, and a second acoustic device can be positioned in a different location in the flow meter device 128 to generate acoustic signals for an oil phase of the fluid, etc. The acoustic signals can include different frequencies, which may indicate different phases of the fluid. Additionally, the acoustic signals can be used to make multi-phase measurements of the fluid, to determine flow characteristics of the fluid, or a combination thereof.

At block 604, the acoustic signals generated by the flow meter device 128 are detected. In some examples, the flow meter device 128 can include one or more sensors for detecting the acoustic signals. The sensors can include an absolute pressure sensor, a differential pressure sensor, a fiber-optic cable, a fiber-optic sensor, an orientation detection sensor, a temperature sensor, other suitable sensors, or any suitable combination thereof. The sensors can be positioned in any suitable location with respect to the flow meter device 128. For example, one or more sensors can be positioned on an entrance path for flowing fluid into the flow meter device 128, on one or more feedback loops within an acoustic device 110 of the flow meter device 128, on an exit path for flowing fluid out of the flow meter device 128, etc. In some examples, the sensors can be positioned in the wellbore 102 (e.g., not on or in the flow meter device 128) for detecting the acoustic signals. The sensors can detect or otherwise receive the acoustic signals, can convert the acoustic signals, and can transmit the converted signals to the memory tool 132.

At block 606, the signals are received and stored by the memory tool 132 for a predetermined amount of time. The memory tool 132 can be communicatively coupled to the flow meter device 128 or any suitable sensor or component thereof. The memory tool 132 can receive the signals (e.g., acoustic or converted) from the sensors. In some examples, the memory tool 132 can include one or more sensors that can detect the acoustic signals from the flow meter device 128 and store the acoustic signals, or converted signals based on the acoustic signals, on the memory tool 132. The memory tool 132 can store or log the signals for a predetermined amount of time for subsequent use in determining flow characteristics relating to fluid flowing in the wellbore 102. In some examples, the memory tool 132 can be retrieved after a predetermined amount of time in the wellbore 102. Additionally or alternatively, the memory tool 132 can be retained in the wellbore 102 and communicatively coupled, after the predetermined amount of time, to the computing device 116 for analyzing the multi-phase measurements. Accordingly, the multi-phase measurements can be analyzed via any suitable temporal relationship with respect to retrieving the memory tool 132 from the wellbore 102.

The computing device 116 can be communicatively coupled (e.g., subsequent to or prior to retrieval from the wellbore 102) to the memory tool 132. The computing device 116 can receive the multi-phase measurements from the memory tool 132, and the computing device 116 can use the multi-phase measurements to determine one or more flow characteristics of the fluid flowing in the wellbore 102. For example, the computing device 116 can use the multi-phase measurements of the fluid to determine phase-specific flow rates, phase-specific viscosities, phase ratios, production values, other suitable flow characteristics, or any suitable combination thereof. In some examples, the computing device 116 can execute a machine-learning model 512 that can be applied to the multi-phase measurements to determine the flow characteristics. Data, such as the multi-phase measurements and the like, generated via the flow meter device 128 and stored by the memory tool 132 can be used to control a wellbore operation. For example, data stored by the memory tool 132 can be used to control a wellbore exploration operation, a wellbore drilling operation, a wellbore completion operation, a wellbore stimulation operation, a wellbore production operation, other suitable operations, or any suitable combination thereof. In some examples, the flow characteristics determined, based on the multi-phase measurements, by the computing device 116 can be used to control the wellbore operation.

Figure 7:
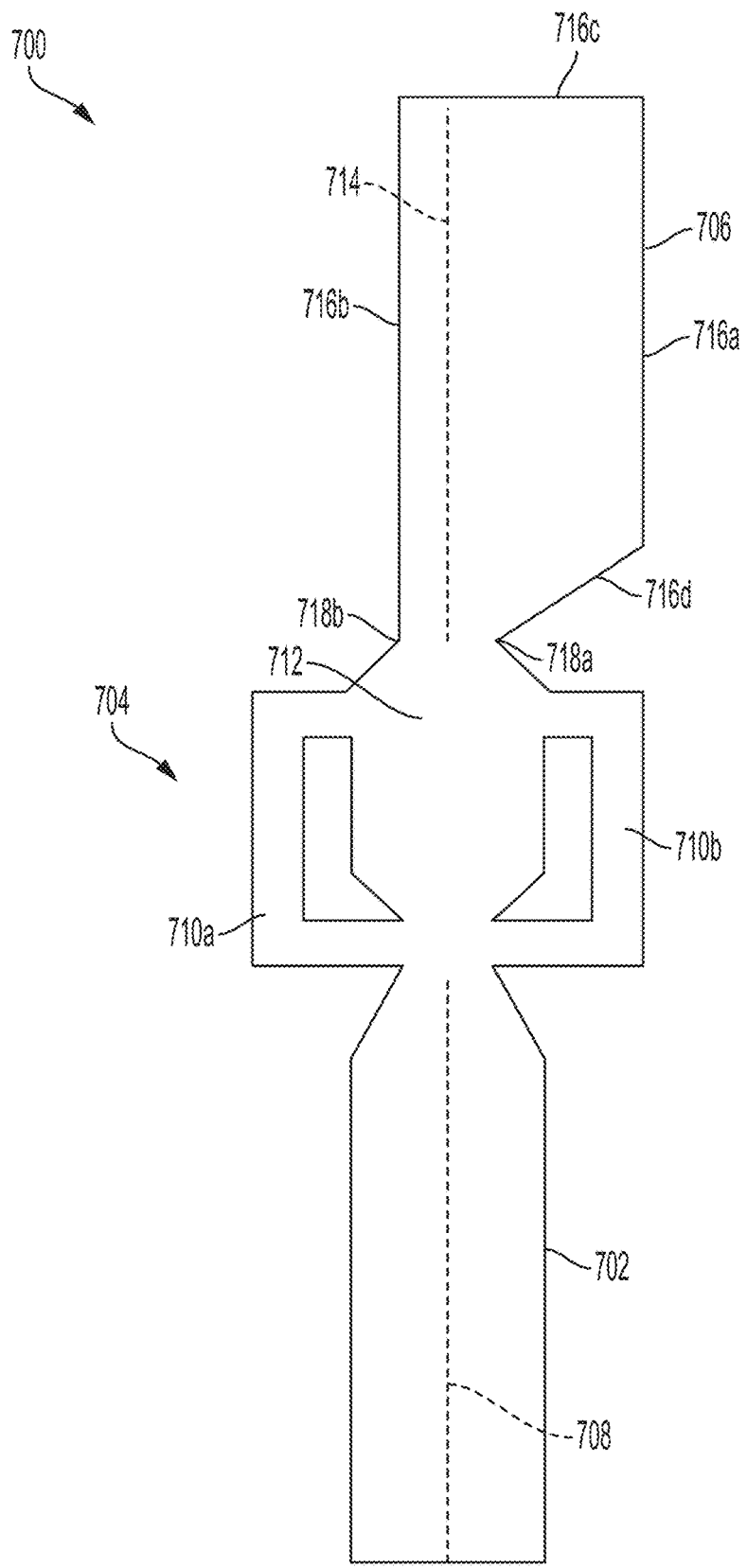
FIG. 7 is a diagram of one example of an asymmetric fluidic oscillator according to one example of the present disclosure.

FIG. 7 is a diagram of an asymmetric fluidic oscillator 700 according to one example of the present disclosure. The fluidic oscillator 700 can include an inlet channel 702, a feedback system 704, an outlet channel 706, and any other suitable components. The fluidic oscillator 700 can be included in the flow meter device 128 and may cause acoustic signals to be generated via oscillating fluid flow in the fluidic oscillator 700. The inlet channel 702 may include a receiving path in the fluidic oscillator 700. For example, the inlet channel 702 can receive fluid that may originate upstream from the fluidic oscillator 700, and the inlet channel 702 can direct the fluid further into the fluidic oscillator 700 such as into the feedback system 704. As illustrated in FIG. 7, the inlet channel 702 is symmetric about axis 708, but the inlet channel 702 may be symmetric about other suitable axes or may be asymmetric.

The feedback system 704 can be coupled to the inlet channel 702, the outlet channel 706, other suitable components, etc. The feedback system 704 can include a first feedback loop 710a, a second feedback loop 710b, a mixing chamber 712, any other suitable components, etc., and may be otherwise suitable shaped or configured. For example, the feedback system 704 can include more or fewer feedback loops 710, a differently sized or shaped mixing chamber 712, differently shaped or sized feedback loops 710, etc. for oscillating the fluid.

The outlet channel 706 can be coupled to the feedback system 704. For example, the outlet channel 706 can be coupled to the feedback loops 710a-b, the mixing chamber 712, etc. The outlet channel 706 may define an exit path for fluid received from the feedback system 704. For example, fluid may be received from the feedback system 704 by the outlet channel 706, and the outlet channel 706 may direct the fluid out of the fluidic oscillator 700.

The outlet channel 706 may be asymmetric. For example, the outlet channel 706 may not be symmetric along any suitable axes of the outlet channel 706. As illustrated, the outlet channel 706 is not symmetric about axis 714, which may be similar or identical to the axis 708 of the inlet channel 702. The asymmetric nature of the outlet channel 706 may cause disruptions or other suitable variations in flow of fluid that passes through the outlet channel 706. For example, the outlet channel 706 may interrupt the natural flow of the fluid, and the interruption may cause vibrations or other suitable acoustic signals.

The outlet channel 706 can be an irregularly shaped quadrilateral or any other suitable irregular or asymmetric shapes. The outlet channel 706 can include a right side 716a, a left side 716b, a top side 716c, and a bottom side 716d. The right side 716a may be connected to the bottom side 716d and to the top side 716c, the left side 716b may be connected to the top side 716c and to the feedback system 704, and the bottom side 716d may be connected to the feedback system 704. The right side 716a and the left side 716b may be substantially parallel to one another. In other examples, the right side 716a and the left side 716b may be non-parallel. Additionally, the top side 716c and the bottom side 716d may be non-parallel for forming the asymmetric feature of the outlet channel 706. In some examples, the asymmetric feature can be formed via the bottom side 716d coupling to the feedback system 704 in a first location 718a, while the left side 716b is coupled in a second location 718b to the feedback system 704. Accordingly, the right side 716a may be shorter than the left side 716b, and the bottom side 716d may include a defined and non-zero slope.

In some aspects, systems and methods for a memory tool for logging multi-phase measurements of fluid in a wellbore are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a flow meter device comprising one or more acoustic devices positionable to generate acoustic signals in a wellbore; one or more sensors positionable to detect the acoustic signals from the flow meter device for making multi-phase measurements of fluid with respect to the wellbore; and a memory tool communicatively couplable to the one or more sensors to receive and store the multi-phase measurements for a predetermined amount of time for determining flow characteristics of the fluid.

Example 2 is the system of example 1, wherein the one or more sensors include an absolute pressure sensor, a differential pressure sensor, an orientation sensor, a temperature sensor, or a resistivity sensor, and wherein the one or more sensors are positioned in the flow meter device.

Example 3 is the system of example 1, wherein the memory tool is couplable to the flow meter device using a dissolvable element, and wherein the memory tool is retrievable, via dissolving the dissolvable element, from the wellbore for determining the flow characteristics of the fluid.

Example 4 is the system of example 1, further comprising a computing device comprising: a processor; and a non-transitory computer-readable medium comprising instructions that are executable by the processor for causing the processor to perform operations comprising: receiving the multi-phase measurements from the memory tool; and determining, using a machine-learning model, the flow characteristics of the fluid based on the multi-phase measurements, wherein the flow characteristics include a phase-specific flow rate, a viscosity, or a composition of the fluid.

Example 5 is the system of any of examples 1 and 4, wherein the memory tool is communicatively couplable to the computing device to determine the flow characteristics based on the multi-phase measurements while the memory tool is positioned in the wellbore.

Example 6 is the system of any of examples 1 and 5, wherein the memory tool is communicatively couplable to the computing device to determine the flow characteristics based on the multi-phase measurements subsequent to the memory tool being retrieved from the wellbore.

Example 7 is the system of example 1, wherein the multi-phase measurements or the flow characteristics are usable to control a wellbore operation, and wherein the wellbore operation includes a wellbore exploration operation, a wellbore completion operation, or a wellbore production operation.

Example 8 is a method comprising: receiving, by a memory tool, multi-phase measurements from one or more sensors, the multi-phase measurements corresponding to acoustic signals received by the one or more sensors, the acoustic signals generated by one or more acoustic devices positioned in a flow meter device for generating the acoustic signals in response to fluid flowing in a wellbore; storing, by the memory tool, the multi-phase measurements for a predetermined amount of time; and providing, by the memory tool and subsequent to the predetermined amount of time, the multi-phase measurements for determining flow characteristics of the fluid.

Example 9 is the method of example 8, wherein the one or more sensors include an absolute pressure sensor, a differential pressure sensor, an orientation sensor, a temperature sensor, or a resistivity sensor, and wherein the one or more sensors are positioned in the flow meter device.

Example 10 is the method of example 8, wherein the memory tool is coupled to the flow meter device using a dissolvable element, and wherein the method further comprises: retrieving, by dissolving the dissolvable element, the memory tool from the wellbore for determining the flow characteristics of the fluid.

Example 11 is the method of example 8, further comprising: receiving, by a computing device, the multi-phase measurements from the memory tool; and determining, by the computing device and using a machine-learning model, the flow characteristics of the fluid based on the multi-phase measurements, wherein the flow characteristics include a phase-specific flow rate, a viscosity, or a composition of the fluid.

Example 12 is the method of any of examples 8 and 11, wherein receiving the multi-phase measurements includes communicatively coupling the memory tool to the computing device to determine the flow characteristics based on the multi-phase measurements while the memory tool is positioned in the wellbore.

Example 13 is the method of any of examples 8 and 11, wherein receiving the multi-phase measurements includes communicatively coupling the memory tool to the computing device to determine the flow characteristics based on the multi-phase measurements subsequent to the memory tool being retrieved from the wellbore.

Example 14 is the method of example 8, further comprising controlling a wellbore operation using the multi-phase measurements or the flow characteristics, wherein the wellbore operation includes a wellbore exploration operation, a wellbore completion operation, or a wellbore production operation.

Example 15 is a flow meter device comprising: one or more acoustic devices positionable to generate acoustic signals in a wellbore; one or more sensors positionable to detect the acoustic signals from the one or more acoustic devices for making multi-phase measurements of fluid with respect to the wellbore; and a memory tool communicatively couplable to the one or more sensors to receive and store the multi-phase measurements for a predetermined amount of time for determining flow characteristics of the fluid.

Example 16 is the flow meter device of example 15, wherein the one or more sensors include an absolute pressure sensor, a differential pressure sensor, an orientation sensor, a temperature sensor, or a resistivity sensor.

Example 17 is the flow meter device of example 15, wherein the memory tool is couplable to the flow meter device using a dissolvable element, and wherein the memory tool is retrievable, via dissolving the dissolvable element, from the wellbore for determining the flow characteristics of the fluid.

Example 18 is the flow meter device of example 15, wherein the memory tool is communicatively couplable to a computing device that comprises: a processor; and a non-transitory computer-readable medium comprising instructions that are executable by the processor for causing the processor to perform operations comprising: receiving the multi-phase measurements from the memory tool while the memory tool is in the wellbore; and determining, using a machine-learning model, the flow characteristics of the fluid based on the multi-phase measurements, wherein the flow characteristics include a phase-specific flow rate, a viscosity, or a composition of the fluid.

Example 19 is the flow meter device of example 15, wherein the memory tool is communicatively couplable to a computing device that comprises: a processor; and a non-transitory computer-readable medium comprising instructions that are executable by the processor for causing the processor to perform operations comprising: receiving the multi-phase measurements from the memory tool subsequent to the memory tool being retrieved from the wellbore; and determining, using a machine-learning model, the flow characteristics of the fluid based on the multi-phase measurements, wherein the flow characteristics include a phase-specific flow rate, a viscosity, or a composition of the fluid.

Example 20 is the flow meter device of example 15, wherein the multi-phase measurements or the flow characteristics are usable to control a wellbore operation, and wherein the wellbore operation includes a wellbore exploration operation, a wellbore completion operation, or a wellbore production operation.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a flow meter device comprising a plurality of fluidic oscillators positionable on a circumference of the flow meter device and arranged a bout an axis of the flow meter device at a common radial distance to generate a plurality of acoustic signals in a wellbore;
   one or more sensors positionable to detect the acoustic signals from the flow meter device for making multi-phase measurements of fluid with respect to the wellbore; and a memory tool communicatively couplable to the one or more sensors using a dissolvable element to receive and store the multi-phase measurements for a predetermined amount of time for determining flow characteristics of the fluid, wherein the memory tool is configured for retrieval, via dissolving the dissolvable element, from the wellbore for determining the flow characteristics of the fluid.

2. The system of claim 1, wherein the one or more sensors include an absolute pressure sensor, a differential pressure sensor, an orientation sensor, a temperature sensor, or a resistivity sensor, and wherein the one or more sensors are positioned in the flow meter device.

3. The system of claim 1, further comprising a computing device comprising:
   a processor; and
   a non-transitory computer-readable medium comprising instructions that are executable by the processor for causing the processor to perform operations comprising:

receiving the multi-phase measurements from the memory tool; and determining, using a machine-learning model, the flow characteristics of the fluid based on the multi-phase measurements, wherein the flow characteristics include a phase-specific flow rate, a viscosity, or a composition of the fluid.

4. The system of claim 3, wherein the memory tool is communicatively couplable to the computing device to determine the flow characteristics based on the multi-phase measurements while the memory tool is positioned in the wellbore.

5. The system of claim 1, wherein the plurality of fluidic oscillators are a plurality of asymmetric fluidic oscillators, and wherein each acoustic signal of the plurality of acoustic signals is generatable by a corresponding asymmetric fluidic oscillator of the plurality of asymmetric fluidic oscillators to be proportional to a flow rate through the corresponding asymmetric fluidic oscillator.

6. The system of claim 1, further comprising a second flow meter device positionable in the wellbore, wherein the second flow meter device comprises a second plurality of fluidic oscillators that are different than the plurality of fluidic oscillators.

7. A method comprising:
receiving, by a memory tool, multi-phase measurements from one or more sensors, the multi-phase measurements corresponding to a plurality of acoustic signals received by the one or more sensors, the plurality of acoustic signals generated by a plurality of acoustic devices that includes a plurality of fluidic oscillators positioned on a circumference of a flow meter device and arranged about an axis of the flow meter device at a common radial distance for generating the plurality of acoustic signals in response to fluid flowing in a wellbore, the memory tool coupled with the one or more sensors via a dissolvable element;
storing, by the memory tool, the multi-phase measurements for a predetermined amount of time;
retrieving, by dissolving the dissolvable element, the memory tool from the wellbore for determining the flow characteristics of the fluid; and
providing, by the memory tool and subsequent to the predetermined amount of time, the multi-phase measurements for determining flow characteristics of the fluid.

8. The method of claim 7, wherein the one or more sensors include an absolute pressure sensor, a differential pressure sensor, an orientation sensor, a temperature sensor, or a resistivity sensor, and wherein the one or more sensors are positioned in the flow meter device.

9. The method of claim 7, further comprising:
receiving, by a computing device, the multi-phase measurements from the memory tool; and
determining, by the computing device and using a machine-learning model, the flow characteristics of the fluid based on the multi-phase measurements, wherein the flow characteristics include a phase-specific flow rate, a viscosity, or a composition of the fluid.

10. The method of claim 9, wherein receiving the multi-phase measurements includes communicatively coupling the memory tool to the computing device to determine the flow characteristics based on the multi-phase measurements while the memory tool is positioned in the wellbore.

11. The method of claim 9, wherein receiving the multi-phase measurements includes communicatively coupling the memory tool to the computing device to determine the flow characteristics based on the multi-phase measurements subsequent to the memory tool being retrieved from the wellbore.

12. The method of claim 7, further comprising controlling a wellbore operation using the multi-phase measurements or the flow characteristics, wherein the wellbore operation includes a wellbore exploration operation, a wellbore completion operation, or a wellbore production operation.

13. A flow meter device comprising:
a plurality of fluidic oscillators positionable on a circumference of the flow meter device and arranged about an axis of the flow meter device at a common radial distance to generate a plurality of acoustic signals in a wellbore;
one or more sensors positionable to detect the acoustic signals from the plurality of acoustic devices fluidic oscillators for making multi-phase measurements of fluid with respect to the wellbore; and
a memory tool communicatively couplable to the one or more sensors using a dissolvable element to receive and store the multi-phase measurements for a predetermined amount of time for determining flow characteristics of the fluid, wherein the memory tool is configured for retrieval, via dissolving the dissolvable element, from the wellbore for determining the flow characteristics of the fluid.

14. The flow meter device of claim 13, wherein the one or more sensors include an absolute pressure sensor, a differential pressure sensor, an orientation sensor, a temperature sensor, or a resistivity sensor.

15. The flow meter device of claim 13, wherein the memory tool is communicatively couplable to a computing device that comprises:
a processor; and
a non-transitory computer-readable medium comprising instructions that are executable by the processor for causing the processor to perform operations comprising:
receiving the multi-phase measurements from the memory tool while the memory tool is in the wellbore; and
determining, using a machine-learning model, the flow characteristics of the fluid based on the multi-phase measurements, wherein the flow characteristics include a phase-specific flow rate, a viscosity, or a composition of the fluid.

16. The flow meter device of claim 13, wherein the memory tool is communicatively couplable to a computing device that comprises:
a processor; and
a non-transitory computer-readable medium comprising instructions that are executable by the processor for causing the processor to perform operations comprising:
receiving the multi-phase measurements from the memory tool subsequent to the memory tool being retrieved from the wellbore; and
determining, using a machine-learning model, the flow characteristics of the fluid based on the multi-phase measurements, wherein the flow characteristics include a phase-specific flow rate, a viscosity, or a composition of the fluid.

17. The flow meter device of claim 13, wherein the multi-phase measurements or the flow characteristics are usable to control a wellbore operation, and wherein the wellbore operation includes a wellbore exploration operation, a wellbore completion operation, or a wellbore production operation.

\* \* \* \* \*